United States Patent [19]

Burkner

Best Available Copy

[11] E Re. 30,759

[45] Reissued Oct. 6, 1981

[54] METHOD AND APPARATUS FOR PRODUCING AND TRANSPORTING SINGLE AND MULTILAYER CHIPBOARDS

[75] Inventor: Wolfgang Burkner, Darmstadt, Fed. Rep. of Germany

[73] Assignee: Carl Schenck AG, Darmstadt, Fed. Rep. of Germany

[21] Appl. No.: 115,117

[22] Filed: Jan. 24, 1980

Related U.S. Patent Documents

Reissue of:

[64] Patent No.: 3,542,629
Issued: Nov. 24, 1970
Appl. No.: 719,924
Filed: Apr. 9, 1968

[30] Foreign Application Priority Data

Apr. 11, 1967 [DE] Fed. Rep. of Germany ..... 40517

[51] Int. Cl.[3] ..... B29J 5/00; B30B 7/02; B30B 15/30; B30B 15/34

[52] U.S. Cl. ..... 264/118; 156/246; 156/250; 156/378; 156/500; 156/510; 156/583.1; 100/93 P; 100/196; 100/208; 264/40.4; 264/138; 425/140; 425/297; 425/310; 425/406

[58] Field of Search ..... 156/62.2, 242, 246, 156/250, 500, 501, 510, 538, 558, 583.1, 378, 379, 539; 264/109, 122, 40.4, 118, 138; 425/128, 172, 297, 315, 310, 406; 100/93 P, 194, 196, 208, 297

[56] References Cited

U.S. PATENT DOCUMENTS

| | | | |
|---|---|---|---|
| 2,693,135 | 11/1954 | Frost | 100/196 |
| 3,173,976 | 3/1965 | Paerels et al. | 264/109 |
| 3,372,217 | 3/1968 | Paerels et al. | 264/122 |
| 3,478,137 | 11/1969 | Barshefsky et al. | 264/122 X |

FOREIGN PATENT DOCUMENTS

| | | |
|---|---|---|
| 1162550 | 2/1964 | Fed. Rep. of Germany . |
| 1236182 | 3/1967 | Fed. Rep. of Germany . |

OTHER PUBLICATIONS

Scheibert, W. *Spanplatten* German Publication, 1958, pp. 85–91 and Table 4.

*Primary Examiner*—Michael G. Wityshyn

[57] ABSTRACT

Method of producing chipboards includes conveying elongated cauls end-to-end sequentially past a material-dispensing device, forming a mat of the dispensed material on the cauls, severing the mat transversely to chipboard lengths, feeding the severed mat lengths together with the cauls into a heating press and beating and compressing the same to form chipboards, withdrawing the chipboards and cauls together from the heating press and separating them from one another, and continuously reconveying the cauls past the material-dispensing device.

In apparatus for carrying out the method, an endless conveyor for conveying the cauls end-to-end has entrainer dogs engageable with abutment rods on the cauls for advancing the cauls in a substantially horizontal conveying direction along an upper run of the conveyor located below the material-dispesing device.

6 Claims, 4 Drawing Figures

METHOD AND APPARATUS FOR PRODUCING AND TRANSPORTING SINGLE AND MULTILAYER CHIPBOARDS

Matter enclosed in heavy brackets [ ] appears in the original patent but forms no part of this reissue specification; matter printed in italics indicates the additions made by reissue.

My invention relates to method and apparatus for producing and transporting single- and multilayer chipboards.

Chipboard production methods are known wherein loading cauls that are passed continually or reversibly below a chip-dispensing or spreading device at a boardforming station are thereby provided with mats of chips, the cauls, after pre-pressing of the mats thereon, are passed into a press together with the mats to be formed into boards, and after the chipboards have been formed by pressure in the press, the cauls are returned to the boardforming station. A disadvantage of these known methods is unavoidable warping of the cauls which increases considerably with higher temperatures and increasingly larger caul dimensions, thereby rendering the cauls prematurely unserviceable. Further disadvantages are the unavoidable caul plate tolerances with respect to the thickness thereof, as well as the limitation in the caul plate dimensions, especially in width, due to the conveyor roller guides or rails on which the cauls are transported and the absolute necessity of using special expensive caul plates for higher temperatures. Other disadvantages are the unavoidable costs of cooling the caul plates which, furthermore, inevitably reduces the useful longevity of the caul plates. These disadvantages have till now been endured in a major portion of the known installations because such caul plates afford maximum versatility with respect to the operating reliability of such installations and with respect to the potentialities of process employed in wood technology.

In order to avoid the foregoing disadvantages, single-tier installations with steel band feeding have been employed which have, however, been necessarily limited in use due to the reduced capacities thereof relative to the attainable heating periods in the single-tier press, and are necessarily accompanied by great technological difficulties due to the short heating periods.

In addition, so-called caul-less installations have been used wherein the shaped mat is passed alone into the heating press without any caul and is pressed therein into a board. Thereby, the disadvantages of the caul installations, relative to the disadvantageous characteristics of the cauls proper, are eliminated. However, consequent grave and unavoidable difficulties must be taken into account, namely the necessity for scaling off or removing the mat pressed in a cold pre-pressing operation from a flat or flexible support, or pre-pressing the chip mat in the main press proper while the mat being formed into the board is covered in order to avoid deleterious side effects such as prior condensation of the chip binder or pre-pressing by means of band-trays, whereby the non-densified mat suffers slight structural changes or damage as it passes on its S-shaped path onto the heating platen of the heating press. In the last-mentioned method, the engineering cost is particularly great and the installation is correspondingly susceptible to damage.

During the pre-pressing operation, loss of quality of the pre-pressed surface and limitations with regard to the degree of fineness of the covering layer material used must be put up with. The last-mentioned disadvantage is particularly serious, because further developments in the are of chipboard manufacture show a tendency clearly toward fine and very fine covering layer chip material. The production of thin, large-sized chipboards is, moreover, jeopardized during the pre-pressing operation. In addition, restrictions in wood technology relating to wood moisture, degree of gluing or binding, the moduli of elasticity of the types of wood that are used are characteristic for this manufacturing process.

All of the aforementioned systems are additionally subjected to the unavoidable great disadvantage that the chipboard cross section is trough-shaped and has a somewhat double-concave appearance. This disadvantageous appearance is essentially determined by the sharp drop in moisture content from the center of the board to the edge thereof, and is caused by nonuniform evaporation of the moisture over the cross section of the chipboard.

It is accordingly an object of my invention to provide method and apparatus for producing chipboards which avoids the foregoing disadvantages of the heretofore known methods and apparatus of this general type. More specifically, it is an object of my invention to avoid the disadvantages of a narrow tolerance range for the chipboards after final pressing thereof in regard to the thickness thereof.

It is a further object of my invention to pass a screen-like caul through a heating press and thereby effect a considerable simplification in the production of chipboards with increased operating reliability and reduction in the prime cost of the installation while maintaining all of the heretofore known spreading and dispensing methods without any technological restrictions regarding the type of wood, wood moisture, degree of gluing or binding as well as avoiding a pre-pressing operation at high specific pressure.

It is yet another object of my invention, by employing screen-like cauls which are produced, for example, from steel wires or other materials having comparable characteristics, to considerably shorten the heretofore necessary cooling-off period required for compression plates or sheet metal cauls, as well as to eliminate all of the disadvantages such as distortion and buckling of these plates.

It is a concomitant object of my invention to achieve unhampered removal of water vapor during the pressing operation by providing the screen-like cauls and thereby prevent formation of a trough-shaped finished chipboard. Still another object of my invention is to cover the chip mat by placing screen-like cauls thereon to permit unhampered removal of water vapor within the heating press.

With the foregoing and other objects in view, I provide in accordance with my invention a novel and advanced method of producing flat chipboards of uniform thickness which comprises applying or dispensing, continuously in one or more layers, material such as wood shavings, fibers or the like, mixed with a binding agent, at the pressing stations onto screen-like cauls which are conveyed past the dispensing stations by a chain conveyor individually with the narrow sides thereof located closely following one another or partly overlapping one another. Thereafter, I transversely sever the mat of chips formed on the caus in lengths corresponding to the ultimate length of the chipboard that is to be produced. The severed mat portions including the cauls, preferably without being pre-pressed, are then passed to a heating-press feeding device from which they are fed together into a multitier heating press in which they are subjected to pressure and heat forming the chipboards. The fully formed chipboards on the respective cauls are then withdrawn from the heating press, the cauls are then separated from the chipboards and, with the aid of a conveyor and through an interposed storage device therefor, are reconveyed continuously in a closed circuit to the dispensing stations.

In accordance with further modes of the method of my invention, the heating-press feeding device is in the form of a cage having a plurality of tiers, the individual mat portions and the respective cauls on which they are disposed being supplied to all the even-numbered tiers as the cage is stepwise moved upwardly whereas, when the cage is moved downwardly, all of the uneven-numbered tiers are supplied with the respective mats and cauls.

In accordance with yet another feature of the invention, a caul similar to the cauls on which the mat portions are disposed is applied as a covering on the severed mat portion before it has been pre-pressed, is then pressed together with the mat portion and the underlying caul, and is thereafter scaled off the finished chipboard and reconveyed to the location at which it is initially applied.

In accordance with a further feature of my invention, I provide a thrust mechanism for supplying a control station located adjacent the main conveyor, which operates so as to pass onto the control station the severed mat portion oncoming on the main conveyor together with the respective caul on which it is carried, while simultaneously drawing the severed mat portion and its respective caul, which are already located on the control station, into a heating-press feed cage. In a further mode of this method, there is provided another conveyor, located in a closed cycle with the main conveyor, which receives severed mat portions that have been determined by the control station as having a faulty distribution of dispensed material. The other conveyor passes the defective mat portions and respective cauls in a downward direction, the mat portions are separated from the cauls, the chip material of the mat portions is fed to a collecting worm conveyor while the cauls are returned by a caul-supply conveyor to the main conveyor.

Also in accordance with my invention, I provide, in apparatus for carrying out the method of the invention, a main chain conveyor for conveying at least two elongated screen-like cauls overlapping at opposite narrow sides thereof, the conveyor having a lower and upper run moving in horizontal direction about a support structure formed as a table. The cauls have a ledge at the leading edge thereof engageable by entrainer members extending from the conveyor, for advancing the cauls in horizontal direction along the upper run thereof which is located below the device for dispensing the chip material onto the cauls.

Another feature of the apparatus of my invention is to provide the thrust mechanism with grippers for engaging the ledges of the cauls behind the same in the conveying direction thereof, a horizontally disposed connecting member for the grippers adjustable to a suitable length, and a conveyor producing a horizontal motion operatively connected to the connecting member for driving the same in a horizontal direction.

Other features of the apparatus of the invention comprise a regulatable pivoting table located between the control station and a heating-press supply cage, the pivoting table being controllable by the control station for passing a screen-like caul supporting a severed mat portion from the control station to the heating-press supply cage, screen-like cauls being disposed within the heating press on the undersides of the heating platens located therein.

In accordance with an additional feature of the invention, there is provided a heating-press emptying cage which is provided with a slotted horizontal plate, closed at the underside thereof by its own conveyor, whereas all the other tiers are actuable by a common beam for pushing mat portions on cauls in those other tiers into the heating press. In a modification, a tablet or plate closable at the underside thereof is located at each tier.

In accordance with yet further features of my invention, there is provided a heating-press emptying cage adjacent the heating press and controlled in the same manner as the heating-press supply cage is controlled. A reversing conveyor device is located adjacent the heating-press emptying cage for receiving completely pressed chipboards and the respective cauls thereon, passing them to a separating station whereat the chipboards and the cauls are separated from one another, and reconveying the individual cauls by means of a supply conveyor system through an interposed collecting device to the lower run of the main chain conveyor so that the cauls overlap at the narrow sides thereof and form a continuous band.

Other features which are considered as characteristic for the invention are set forth in the appended claims.

Although the invention is illustrated and described herein as method and apparatus for producing and transporting single- and multilayer chipboards, it is nevertheless not intended to be limited to the details shown, since various modifications may be made in the method and structural changes in the apparatus without departing from the spirit of the invention and within the scope and range of equivalents of the claims.

The construction of the apparatus of the invention and the operating steps of the method of the invention, however, together with additional objects and advantages thereof will be best understood from the following description of specific embodiments of the apparatus and specific modes of the method when read in connection with the accompanying drawings, in which.

Figure 1:
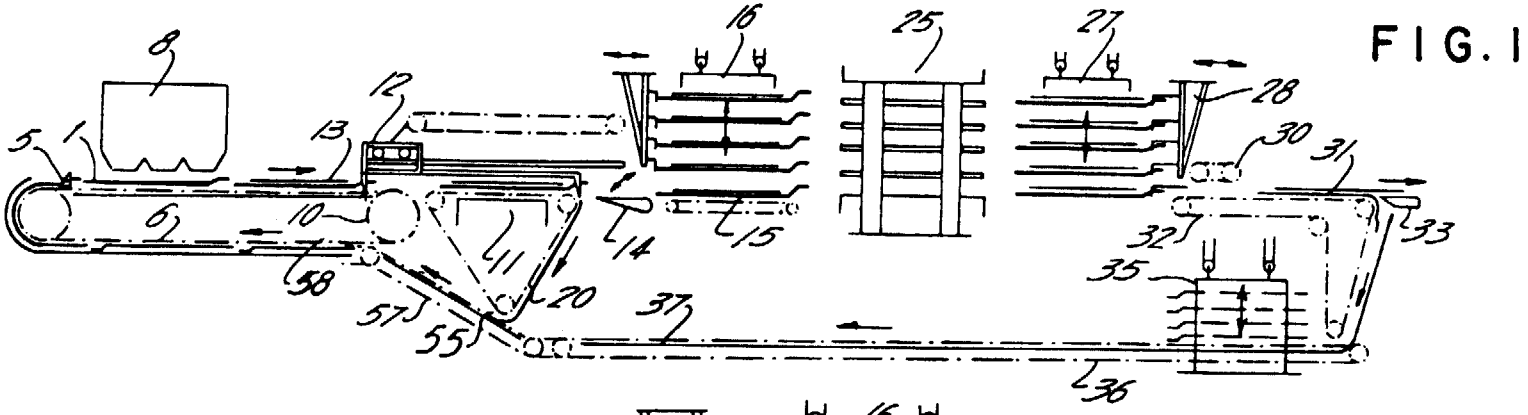
FIG. 1 is a schematic side-elevational view of a system having the apparatus for producing and transporting chipboards in accordance with my invention.
Figure 1A:
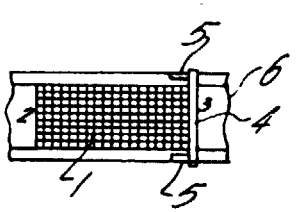
FIG. 1a is a plan view of a fragment of the apparatus of FIG. 1 showing a screen-like caul disposed on the main conveyor.

Referring now to the drawings and first particularly to FIGS. 1 and 1a thereof, there are shown cauls 1 of metal cloth construction that are conveyed substantially in a horizontal direction on a main endless chain conveyor 6 above a table 6' and below and past a dispensing or spreading station 8 constructed in the form of a hopper or series of hoppers from which wood shavings, chips, fibers and the like, as well as a suitable binding agent, are deposited as a continuous mat on the cauls 1. The cauls 1 have a ledge 4 or corresponding abutment at the leading edge thereof which is engageable by a pair of entrainers 5 such as a dog or finger extending from the conveyor 6. Although only one entrainer 5 is shown in FIG. 1, it is obvious that many of such entrainers may be suitably spaced along the conveyor at both lateral edges thereof for holding the cauls in position on the conveyor 6 as the conveyor 6 moves in the direction of the arrows associated therewith. A severing member 9 such as a rotary saw blade located downstream of the dispensing station 8 is periodically actuated to slice the continuous chip mat transversely into mat portions 13 corresponding in length to the ultimate length of the chipboard that is to be produced. The cauls 1 are somewhat elongated and the narrow side 3 at the leading edge thereof has a cranked bend forming the ledge 4 which overlaps the narrow side 4 at the trailing edge of the next immediately preceding caul 1. The slicing of the continuous mat by the severing blade 9 is adjusted so that it occurs at the overlapping ledge 4 of each caul 1 and a separating space is formed between the adjacent cauls. The main chain conveyor 6 is suitably driven by a roller 10 adjacent to which there is located a control station 11 such as a weighing scale, for example, which establishes whether or not the material dispensed onto the cauls is properly distributed or is in sufficient quantity, or the like, thereon. A thrust mechanism 12 is provided above the control station 11 which, in a manner hereinafter described with regard to FIG. 2, sequentially advances each caul 1 with the respective mat portion 13 thereon from the main chain conveyor 6 to the control station 11. Simultaneously, the thrust mechanism 12 advances the caul and mat portion already located at the control station 11 over a horizontally-maintained pivot table 14 so that the caul and mat portion are deposited into a tier 15 of a heating-press supply cage 16 of known construction when the mat portion meets the required specifications. If the scale 11 determines, however, that there is an irregularity in the mat portion 13, the pivot table 14 is suitable actuated to pivot into an upright blocking position so that the caul and defective mat portion are conveyed downwardly by the triangular conveyor 20.

The heating-press supply cage 16 is filled with cauls and mat portions by a known stepping process. Thus as each caul and mat portion is inserted in a tier 15 of the cage 16 it engages a limit switch (not shown) which actuates a suitable lifting mechanism that raises the cage 16 to a position which aligns a lower tier with the upper surface of the control station 11 so that a succeeding caul and mat portion may be inserted thereon.

The cauls and mat portions located in the heating-press supply cage 16 are then fed into the heating press 25 in a manner more fully described hereinafter in regard to FIG. 3. After being completely pressed in the heating press 25, the finished chipboards are withdrawn with their respective cauls from the heating press 25 and inserted in a multitiered emptying cage 27 of substantially similar construction as the supply cage 16. The withdrawal is effected by a withdrawing beam 28 provided with suitable hooks which engage the rear edge of the caul ledges 4 so as to pull the cauls and the mat portions thereon out of the press 25 as the beam 28 is moved in a direction toward the right-hand side of FIG. 1. The cage 27 is emptied stepwise but in an opposite manner than that in which the supply cage 16 is filled. Thus, the cage 27 is lowered a tier at a time as each caul and finished chipboard thereon is pulled out of the cage 27 sequentially by the withdrawing mechanism 30 which hooks onto the ledges 4 of the respective cauls and draws the caul and chipboard onto a conveyor 32. As the caul leaves the tier of the cage 27, it trips a switch which actuates a suitable lowering mechanism corresponding to the lifting mechanism for the cage 16. As illustrated in FIG. 1, by way of example, the lifting and lowering mechanisms are, respectively, a pair of winches.

A separating device 33 is located at the end of the substantially horizontal run of the conveyor 32, which separates the chipboard from the respective caul so that the chipboard is advanced to a non-illustrated further station for additional processing while the caul is passed in a downward direction by a substantially vertical run of the conveyor 32 to a substantially horizontal conveyor 36 which feeds the caul into a collecting cage 35 corresponding to the cages 16 and 27. The cauls are collected in the various tiers of the collecting cage 35 in the aforementioned stepping manner and, as required, are fed further along the supply conveyor 36 over the table-like support structure 37 back to the main chain conveyor 6 to repeat the process.

Figure 2:
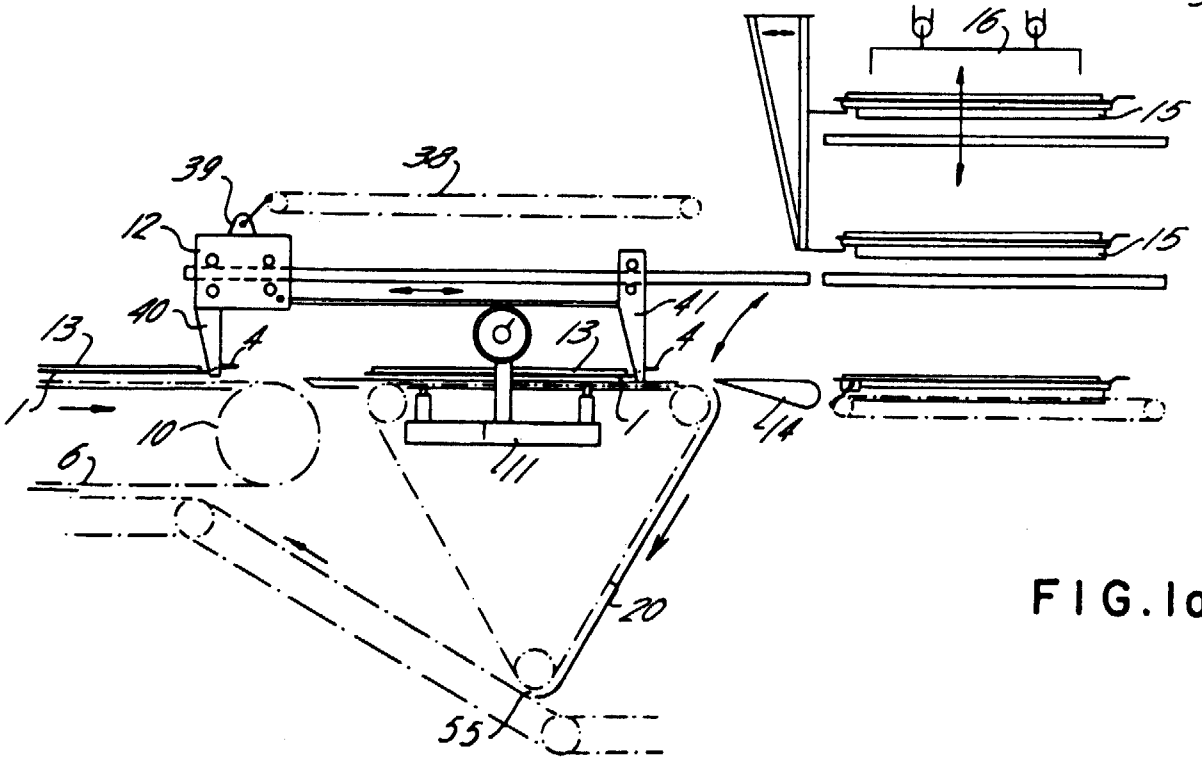
FIG. 2 is an enlarged fragmentary view of FIG. 1 showing in greater detail the control station and heating-press supply cage of the invention.

The thrust mechanism 12, as shown in FIG. 2, is driven by an endless conveyor 38 reciprocatingly in substantially horizontal direction, and includes a connecting member 39, having suitably horizontally spaced grippers or lugs 40 and 41 which, respectively, engage the rear edge of ledges 4 of the cauls located on the main conveyor 6 and at the control station 11 so as to move those cauls simultaneously in a direction toward the right-hand side of FIG. 2 whereby the mat portion 13 already located at the control station is either pulled onto a tier of the heating-press supply cage 16 or is recycled by the conveyor 20 and the mat portion 13 still on the main conveyor 6 is simultaneously pulled onto the scale at the control station 11. If the mat portion on the respective caul is determined by the scale 11 to be defective, it is conveyed downwardly with the caul by the conveyor 20, as aforementioned, to a separating station 21 which separates the mat material from the caul. The material may then be returned to the dispensing station 8 while the caul is returned by an auxiliary conveyor 57 to the main conveyor 6.

If the mat portion on the caul located at the control station 11 is determined to be in conformity with required specifications as to weight, distribution and the like, it is fed with the respective caul by the thrust mechanism 12 into the heating-press supply cage 16 in the following manner: If the supply cage 16 is initially at its uppermost position, the uneven-numbered tiers 15 i.e. the first, third, fifth tiers, for example, thereof are supplied with the respective mat portions and cauls as the cage 16 is moved downwardly. When the cage 16 moves upwardly from its lowermost position, then the even-numbered tiers 16 thereof are sequentially supplied with respective mat portions and cauls. Thus, after loading, the supply cage 16 need only be raised a single tier i.e. from the second tier to the first tier, so as to be brought into the correct position for supplying the mat portions and the respective cauls to the heating press 25.

Figure 3:
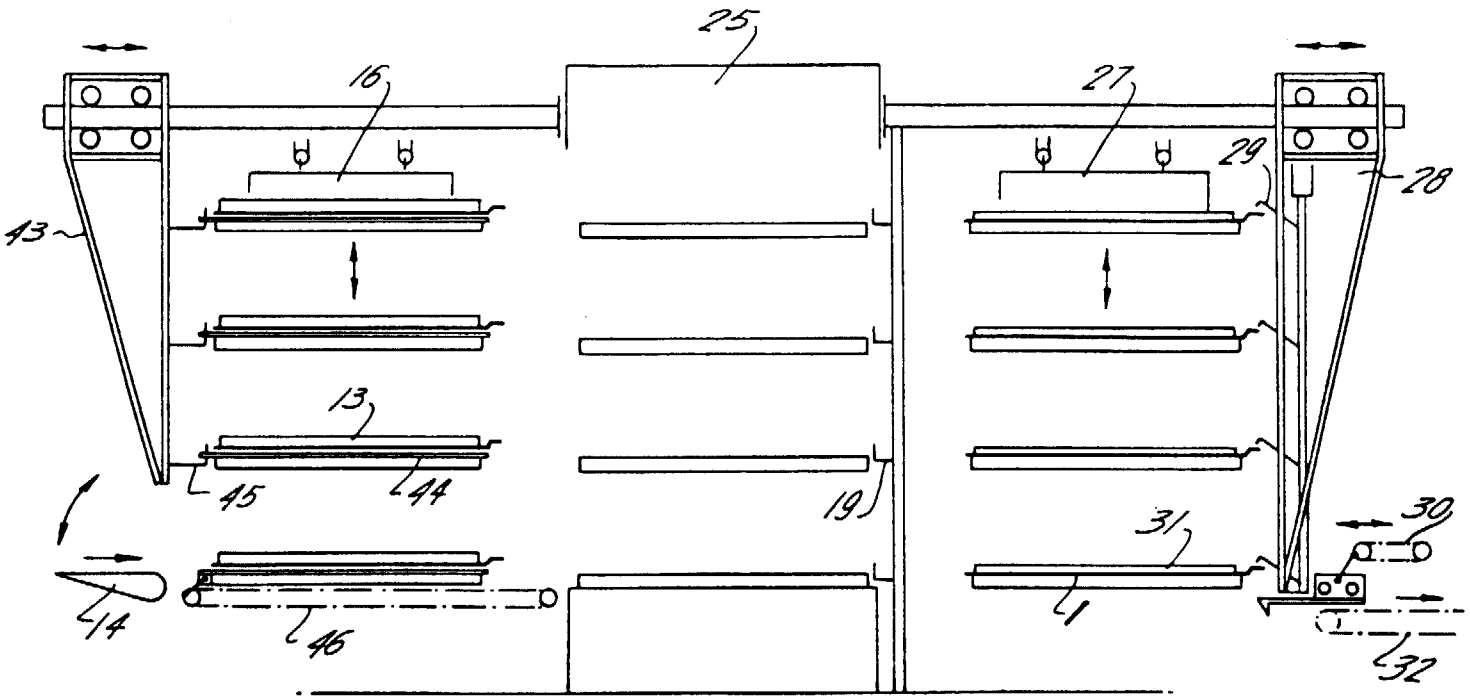
FIG. 3 is another enlarged fragmentary view of FIG. 1 showing in greater detail the heating-press supply and empting cages and the heating press therebetween, as constructed in accordance with the invention.

As shown in greater detail in FIG. 3, the supply of mat portions 13 and respective cauls 1 to the heating press 25 from the supply cage 16 is effected by a common supply beam 43 provided with hooks 45. Trays 44 are respectively provided on each of the tiers of the supply cage 16 so that a respective mat portion carried by a caul is placed on each of the trays. The hooks 45 of the beam 43 respectively engage each of the trays in all of the tiers except the lowermost tier and, when the beam 43 is moved in a direction toward the right-hand side of FIG. 3, all of the trays engaged by the hooks 45 and the mat portions and cauls superimposed thereon are moved into the heating press 25 until the ledges 4 on the respective cauls 1 pass over suitable retaining members 19 located in the heating press 25. The retaining members or hooks 19 thus hold the cauls 1 and the mat portions located thereon in the heating press 25 as the beam 43 is returned in a direction toward the left-hand side of FIG. 3 to the position illustrated therein and simultaneously slides the empty trays 44 out from under the cauls 1 in the heating press 25 and withdraws them from the heating press 25. Meanwhile, the mat portion and caul located on the tray 44 of the lowermost tier in the supply cage 16 is advanced by its own horizontal conveyor 46 into the lowermost tier of the heating press 25 so that during the operation of the thrust mechanism 12 a mat portion 13 can be again introduced onto the lowermost tier of the press supply cage 16 which is provided with a slotted plate closed off at the underside thereof by the conveyor 46.

After the chipboards 31 have been fully pressed, they are drawn by the withdrawing hooks 29 of the withdrawing beam 28, that engage the rear edge of the caul ledges 4, out of the press 25. A withdrawing device 30 is provided with a hook which is operated reciprocatingly in a substantially horizontal direction for engaging the rear edge of the ledges 4 of the respective cauls 1, after the hooks 29 have been disengaged therefrom by suitable means, to successively remove the cauls and the respective chipboards from the cage 27 as it is lowered from tier to tier and to place it on the endless conveyor 32.

As noted hereinbefore, FIG. 1 shows schematically at the right-hand side thereof, the separation of the chipboard 31 and the respective caul 1 from one another at the separating station 33, the accumulation of cauls 1 in the collecting cage 35, and the recycling of the cauls 1 by the supply conveyor 36 to the main conveyor 6. As can be seen in FIG. 1, the respective caul 1 coming from conveyor 20 is transferred with priority at one transfer point 55 between the conveyor 20 and the supply conveyor 36 to the auxiliary distributing conveyor 57. The speed of the conveyor 57 is synchronized with the speed of the main chain conveyor 6 so that at the transfer point 58 between the distributing conveyor 57 and the main chain conveyor 6, there is assurance that the oncoming cauls 1 will overlap at the ends thereof in the desired manner.

It is noted from FIGS. 1 and 2, that whenever the cauls 1 are required to travel along the underside of a conveyor or along a sugstantially vertically extending length of a conveyor, a stationary wall is provided spaced from the conveyor so that the caul is located between the conveyor and the wall and consequently cannot be dislodged from the conveyor.

I claim:

[1. Method of producing and transporting chipboards of material consisting primarily of wood particles, chips, fibers or the like and a binding agent, which comprises conveying a plurality of elongated cauls end-to-end sequentially past a material-dispensing device, continuously spreading material dispensed from the device over the cauls so as to form a continuous mat of the material thereon, transversely severing the mat to form lengths thereof on the respective cauls corresponding substantially to the ultimate length of the chipboard to be formed, feeding the severed mat portions together with the respective cauls into a multitier heating press, subjecting the mat portions and cauls to pressure and heat in the heating press to form the mat portions into chipboards, withdrawing the chipboards and respective cauls together from the heating press, separating the chipboards from the cauls and continuously reconveying the cauls in closed circuit past the material-dispensing device.]

[2. Method according to claim 1, wherein the cauls have a main body portion of the metal cloth construction and a ledge at the leading edge thereof extending laterally beyond the main body portion, and the ledge of one caul overlaps the trailing edge of the immediately preceding caul in the conveying direction of the cauls.]

[3. Method according to claim 1 wherein, prior to feeding the cauls and mat portions into the heating press, they are inserted stepwise into a multitier supply cage that is movable vertically upward and downwardly, the cauls and respective mat portions being inserted into all of the even-numbered tiers of the cage, counting the lowermost tier thereof, as the cage is moved upwardly, and being inserted into the uneven-numbered tiers thereof as the cage is moved downwardly.]

[4. Method according to claim 1 which further comprises placing another caul as a covering on top of the mat portion before the latter is compressed, and thereafter compressing the sandwich formed by the two cauls and the mat portion therebetween, then sealing off the other caul from the formed chipboard and returning it to the location at which it was placed on the mat portion.]

[5. Method according to claim 1 which comprises transferring a mat portion, after it has been severed from the continuous mat, and its respective caul to a control station and simultaneously transferring a mat portion and its respective caul, that have been previously transferred to the control station, into a heating-press supply cage.]

[6. Method according to claim 5 which comprises determining at the control station if the mat portion is defective and in response thereto, conveying the defective mat portion on its respective caul in a downward direction, separating the mat portion from the caul, and reconveying the caul past the material-dispensing device.]

[7. Apparatus for producing and transporting chipboards of material consisting primarily of wood particles, chips, fibers or the like and a binding agent, comprising a material-dispensing device, a plurality of elongaged cauls, main conveyor means for conveying said cauls end-to-end sequentially past said material-dispensing device so that material is continuously spread from said device over said cauls to form a continuous mat of the material thereon, severing means located adjacent said main conveyor means downstream from said material-dispensing device for transversely severing the mat into lengths thereof on the respective cauls corresponding substantially to the ultimate length of the chipboard to be formed, a multitier heating press located downstream from said severing means for receiving said mat portions and respective cauls therein and subjecting them to heat and pressure to form the mat portions into chipboards, means for withdrawing the chipboards and respective cauls together from said heating press, means for separating the chipboards from the respective cauls, and conveyor means for reconveying said cauls in a closed cycle past said material-dispensing device.]

[8. Apparatus according to claim 7 wherein said cauls have a main body portion of metal cloth construction and are provided with a ledge at the leading edge thereof extending laterally beyond said main body portion.]

[9. Apparatus according to claim 7 including a multitier supply cage located upstream of said heating press adapted to receive a mat portion with its respective caul in each tier thereof, and means for simultaneously transferring a plurality of the mat portions and respective cauls into said heating press.]

10. Apparatus according to claim [8] *16* further comprising a horizontally disposed thrust mechanism adjustable to a selected length and having a plurality of gripping members thereon for respectively engaging the ledges of a plurality of cauls at the rear edge thereof so as to advance said cauls in the main conveying direction, and second conveyor means for driving said connecting member in substantially horizontal direction.

11. Apparatus according to claim [8] *16* including a control station located downstream of said severing means for comparing the severed mat portions to nominal specifications, and means operatively connected to said control station for blocking a mat portion from said heating press if it fails to meet the nominal specifications.

12. Apparatus according to claim 11 wherein said control station is located upstream from said supply cage, and said blocking means comprises a pivot table located between said control station and said supply cage.

[13. Apparatus according to claim 7 wherein said heating press is provided with heating platens, and screen-like cauls are disposed on the underside of said heating platens.]

14. Apparatus according to claim [8] *16* wherein said supply cage has a lowermost tier provided with a substantially horizontal slotted plate, and a substantially horizontal conveyor located at the underside of said plate, and a common thrust beam located at all the other tiers of said supply cage for simultaneously transferring mat portions and cauls located at said other tiers into said heating press.

*15. Method of producing and transporting chipboards of material consisting primarily of wood particles, chips, fibers or the like and a binding agent which comprises conveying a plurality of elongated cauls each of which has a main body portion of screen-like metal cloth construction and a ledge at the leading edge thereof extending beyond the main body portion, end to end sequentially past a material dispensing station with the ledge of one caul overlapping the trailing edge of the immediately preceeding caul in the conveying direction, continuously spreading material dispensed from the device over the cauls so as to form a continuous mat of the material thereon, transversely severing the mat to form lengths thereof on the respective cauls corresponding substantially to the ultimate length of the chipboard to be formed, feeding the severed mat portions together with the respective cauls into a multitier heating press, subjecting the mat portions and cauls to pressure and heat in the heating press to form the mat portions into chipboards, withdrawing the chipboards and respective cauls together from the heating press, separating the chipboards from the cauls and continuously reconveying the cauls in closed circuit past the material dispensing device.*

*16. Apparatus for producing and transporting chipboards of material consisting primarily of wood particles, chips, fibers or the like and a binding agent, comprising a material-dispensing device, a plurality of elongated cauls, each of which has a main body portion of screen-like metal cloth construction and a ledge at the leading edge thereof extending laterally beyond said main body portion, main conveyor means for conveying said cauls end-to-end sequentially past said material-dispensing device so that material is continuously spread from said device over said cauls to form a continuous mat of the material thereon, severing means located adjacent said main conveyor means downstream from said material-dispensing device for transversely severing the mat into lengths thereof on the respective cauls corresponding substantially to the ultimate length of the chipboard to be formed, a multitier heating press located downstream from said severing means for receiving said mat portions and respective cauls therein and subjecting them to heat and pressure to form the mat portions into chipboards, a multitier supply cage for feeding said mat portions and respective cauls to said heating press, means for withdrawing the chipboards and respective cauls together from said heating press, means for separating the chipboards from the respective cauls, and conveyor means for reconveying said cauls in a closed cycle past said material-dispensing device.*

* * * * *